(12) United States Patent
Martin et al.

(10) Patent No.: US 7,552,488 B2
(45) Date of Patent: Jun. 30, 2009

(54) RESTRAINT DEVICE FOR A BED IN A MOTOR VEHICLE

(75) Inventors: David M. Martin, Fort Wayne, IN (US); Robert C. Kittelson, Fort Wayne, IN (US); Matthew A. Hoffman, Fort Wayne, IN (US); Seth Rouse, Fairborn, OH (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 309 days.

(21) Appl. No.: 11/464,886

(22) Filed: Aug. 16, 2006

(65) Prior Publication Data

US 2008/0040853 A1 Feb. 21, 2008

(51) Int. Cl.
*A47C 17/80* (2006.01)
*B60P 3/38* (2006.01)
*B60R 21/06* (2006.01)

(52) U.S. Cl. .................. 5/118; 5/424; 296/190.02; 280/749

(58) Field of Classification Search .............. 5/118, 5/94, 424, 425, 427, 159.1, 136, 133; 296/190.01, 296/190.02, 190.03, 24.4, 24.43, 24.46; 280/748, 749
See application file for complete search history.

(56) References Cited

U.S. PATENT DOCUMENTS

| | | | | |
|---|---|---|---|---|
| 298,112 A * | 5/1884 | Nash | ................ | 5/159.1 |
| 2,706,819 A * | 4/1955 | McClure | ................ | 5/94 |
| 2,865,670 A * | 12/1958 | Dunn | ................ | 296/24.42 |
| 2,884,279 A * | 4/1959 | Halstead et al. | ................ | 296/24.42 |
| 2,997,331 A * | 8/1961 | Kudner | ................ | 296/24.46 |
| 3,169,781 A * | 2/1965 | Abruzzino | ................ | 280/749 |
| 3,695,698 A * | 10/1972 | Trump | ................ | 297/487 |
| 3,965,498 A * | 6/1976 | Boni | ................ | 5/6 |
| 4,141,093 A * | 2/1979 | Marsden | ................ | 5/9.1 |
| 4,589,152 A * | 5/1986 | Pakosh | ................ | 5/164.1 |
| 4,708,384 A * | 11/1987 | LaRosa | ................ | 296/24.46 |
| 4,919,467 A * | 4/1990 | Guimelli | ................ | 296/24.43 |
| 4,924,814 A * | 5/1990 | Beaudet | ................ | 119/712 |
| 4,964,666 A * | 10/1990 | Dillon | ................ | 296/24.46 |
| 5,026,231 A * | 6/1991 | Moore | ................ | 410/118 |
| 5,033,134 A * | 7/1991 | Burchett | ................ | 5/133 |
| 5,090,856 A * | 2/1992 | Moore | ................ | 410/118 |
| 5,170,521 A * | 12/1992 | Light | ................ | 5/118 |
| 5,186,587 A * | 2/1993 | Moore | ................ | 410/118 |
| 5,375,879 A * | 12/1994 | Williams et al. | ................ | 280/749 |
| 5,432,963 A * | 7/1995 | Coral et al. | ................ | 5/118 |
| 5,529,341 A * | 6/1996 | Hartigan | ................ | 280/749 |
| 5,536,042 A | 7/1996 | Williams et al. | | |
| 5,978,988 A * | 11/1999 | Burchett | ................ | 5/136 |
| 6,059,313 A * | 5/2000 | Coogan et al. | ................ | 280/749 |
| 6,367,839 B1 * | 4/2002 | Langhoff | ................ | 280/751 |
| 6,405,391 B1 * | 6/2002 | Hakansson | ................ | 5/118 |
| 6,428,044 B1 * | 8/2002 | Ghantae | ................ | 280/748 |
| 6,612,606 B1 * | 9/2003 | Bergenheim et al. | ................ | 280/728.1 |

(Continued)

*Primary Examiner*—Robert G Santos
(74) *Attorney, Agent, or Firm*—Jeffrey P. Calfa; Mark C. Bach (57) ABSTRACT

The invention relates to a safety restraint device for a bed for a motor vehicle to protect the bed's occupant during a crash situation without damaging the frame of the bed. The restraint device attaches to the bed with a pivot bolt. The pivot bolt also pivotally connects the side slat of the bed frame and a pivot bracket.

15 Claims, 9 Drawing Sheets

U.S. PATENT DOCUMENTS

| | | | |
|---|---|---|---|
| 6,669,259 B2 * | 12/2003 | Murray et al. | 296/24.46 |
| 6,827,382 B2 * | 12/2004 | Murray et al. | 296/24.46 |
| 6,983,969 B2 * | 1/2006 | Murray et al. | 296/24.4 |
| 7,073,216 B2 * | 7/2006 | Schwingeler et al. | 5/118 |
| 7,097,204 B2 * | 8/2006 | Jessup et al. | 280/748 |
| 7,195,297 B2 * | 3/2007 | Murray et al. | 296/24.4 |
| 7,300,085 B2 * | 11/2007 | Giumelli | 296/24.43 |
| 2008/0040853 A1 * | 2/2008 | Martin et al. | 5/118 |
| 2008/0060130 A1 * | 3/2008 | Caillaud | 5/136 |

* cited by examiner

RESTRAINT DEVICE FOR A BED IN A MOTOR VEHICLE

BACKGROUND OF THE INVENTION

1. Field of the Invention

The present invention relates to a restraint device for a bed in a motor vehicle, especially a large motor vehicle such as a truck.

2. Description of the Prior Art

Long haul trucking plays a major role in North American shipping. For reasons of economy and convenience, long haul truck tractors are provided with sleepers, semi-enclosed sections of the vehicle cabs extending behind the operator section of the cab. The use of a sleeper on a truck allows the driver to rest and sleep when on the road and away from home. Sleepers typically include one or more bunks for sleeping, and sometimes amenities such as tables, chairs, storage closets and the like. Living space is at a premium in these sections, in part because the permissible length of the compartments is severely limited by legal limitations on the overall length of vehicles and the need to protect the swing clearance area for a trailer attached to the truck tractor's fifth wheel. Therefore, overhead fold down beds provide additional sleeping accommodations in limited space. Due to space constraints, access to the berths is typically limited to one side of the berth.

Being located within the cab structure, the furniture within the sleeper section must meet various performance requirements associated with the proper operation of the vehicle. The beds, whether a built-in bunk or overhead fold down bed, must meet various crash test standards in order to protect the vulnerable occupant sleeping on the bed during a crash.

Figure 9:
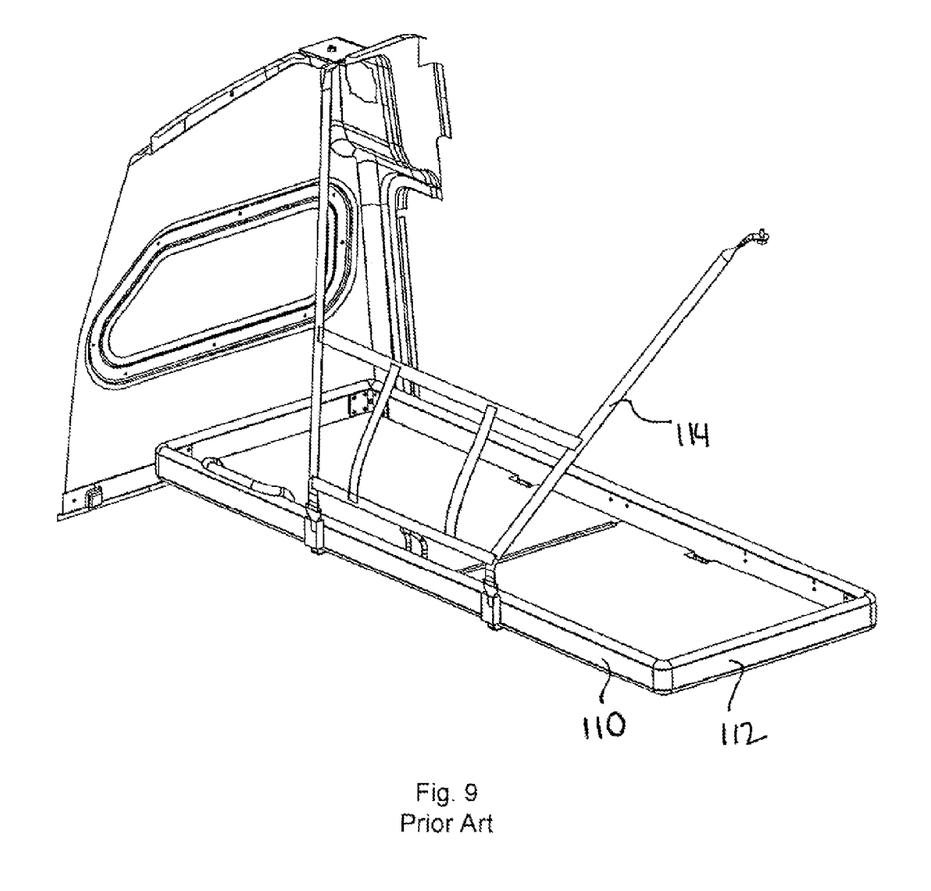
FIG. 9 is a perspective view of a prior art fold down bed installed in a cab.

A fold down bed not only has to meet crash standards, but the bed has to easily fold up and down and lock into a desired position. The beds typically have a net restraint system to protect the occupant. In the prior art shown in FIG. 9, the front of the bed frame 112 receives the load from the restraint system 114. Because the load is concentrated in only two spots in the front, the load can distort the frame. To reduce or prevent this distortion, extra straps are needed for even load distribution.

Therefore, it would be an advantage to produce a restraint system for a bed that distributes the load from the restraint system somewhere other than only the front of the bed frame. It would also be advantageous to produce a restraint system for a bed that does not easily distort the bed during a crash situation.

SUMMARY OF THE INVENTION

According to the invention, a motor vehicle, such as a truck, has a cab enclosure, including a back cab wall and parallel side cab walls. A bed is located within the cab enclosure. The bed has a bed frame with a front slat, a back slat, and opposite side slats between the front and back slats. Each side slat has a pivot hole. A mattress support attaches to the bed frame at the bottom.

A lower restraint device is located on the mattress support, typically between the mattress support and the mattress. Pivot bolts pivotally connect the side slats of the bed frame and pivot brackets and matingly engage the lower restraint device. The pivot brackets connect the bed frame with the side cab walls.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Referring now to the figures where like reference numerals refer to like structures, a large motor vehicle 10, such as a truck 11, has a cab 12 with a front cab wall 15, a back cab wall 14 and side cab walls 16, 17 therebetween to form a cab enclosure 18.

Figure 1:
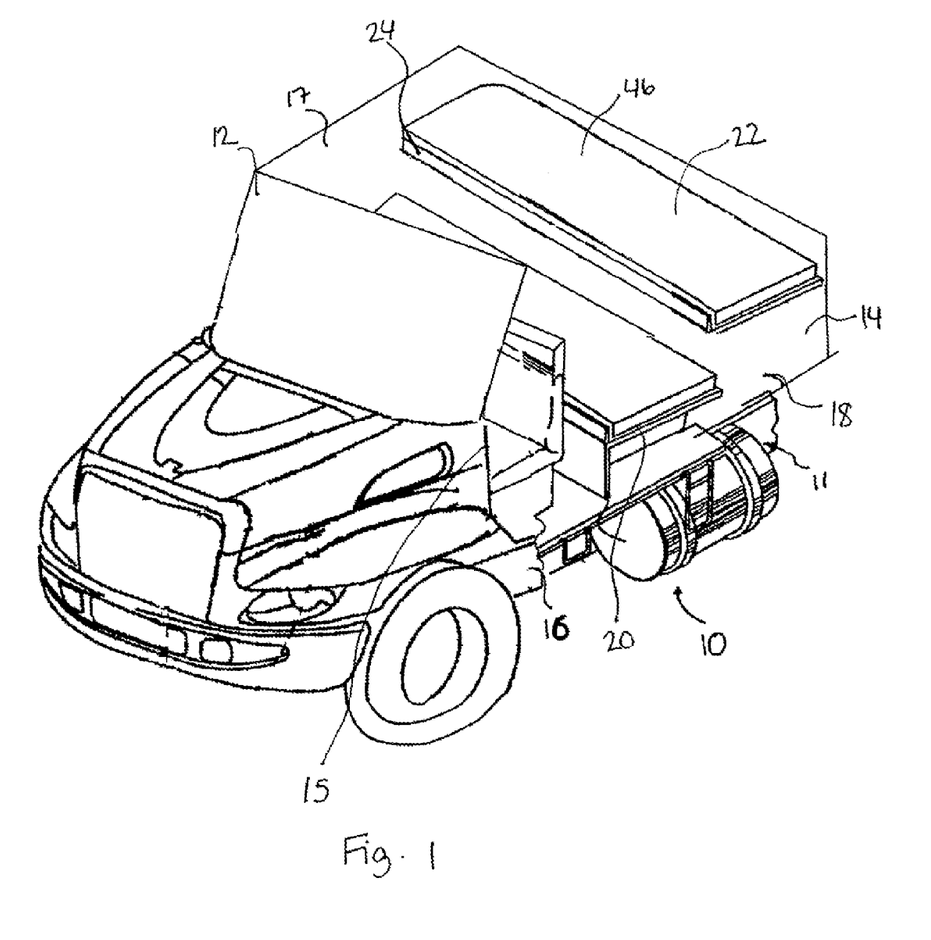
FIG. 1 is a perspective view of a motor vehicle with a fold down bed of the invention.
Figure 2:
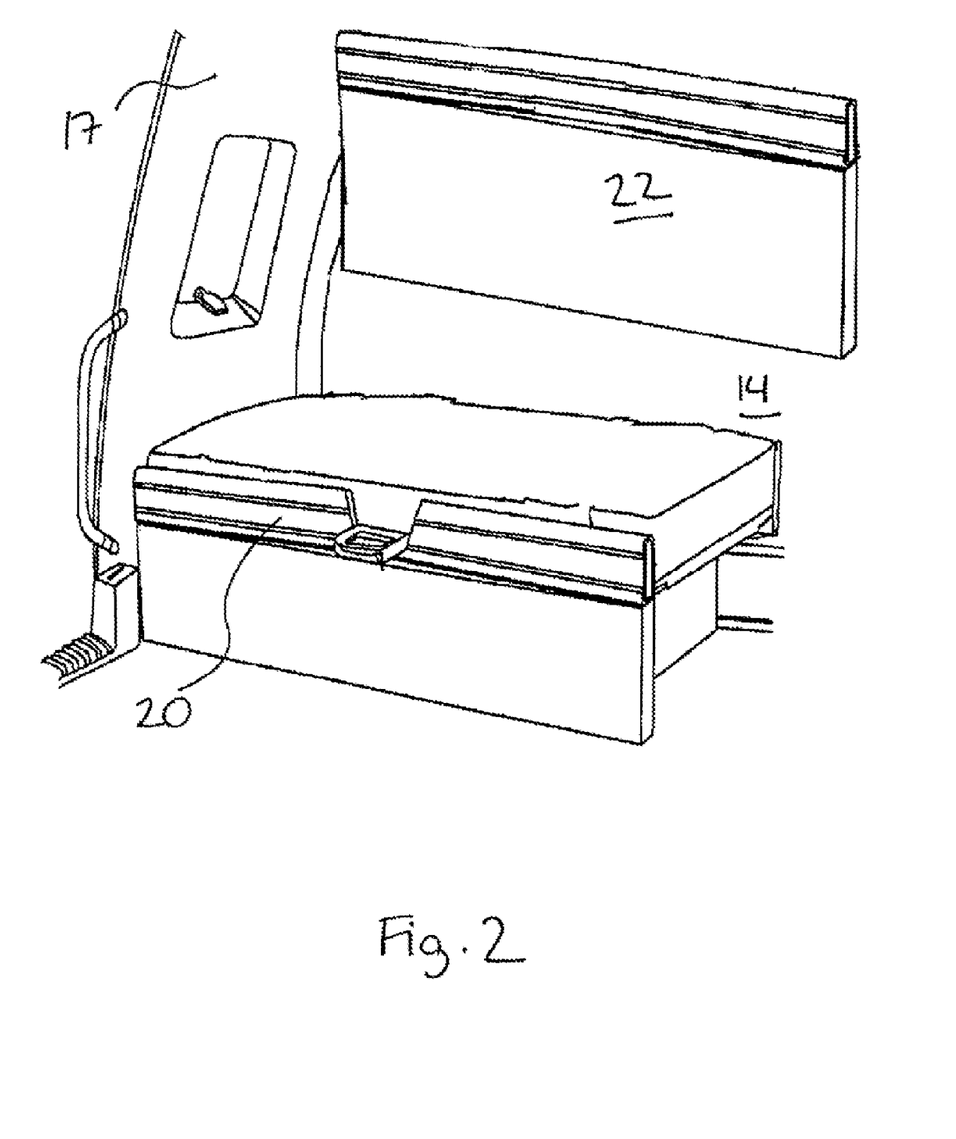
FIG. 2 is a perspective view of a bunk assembly and fold down bed in the folded position.

A bunk assembly 20 is located against the back cab wall 14 and between the side cab walls 16, 17 as seen in FIG. 2. A fold down bed 22 is installed in the cab enclosure 18 above the bunk assembly 20.

Figure 3:
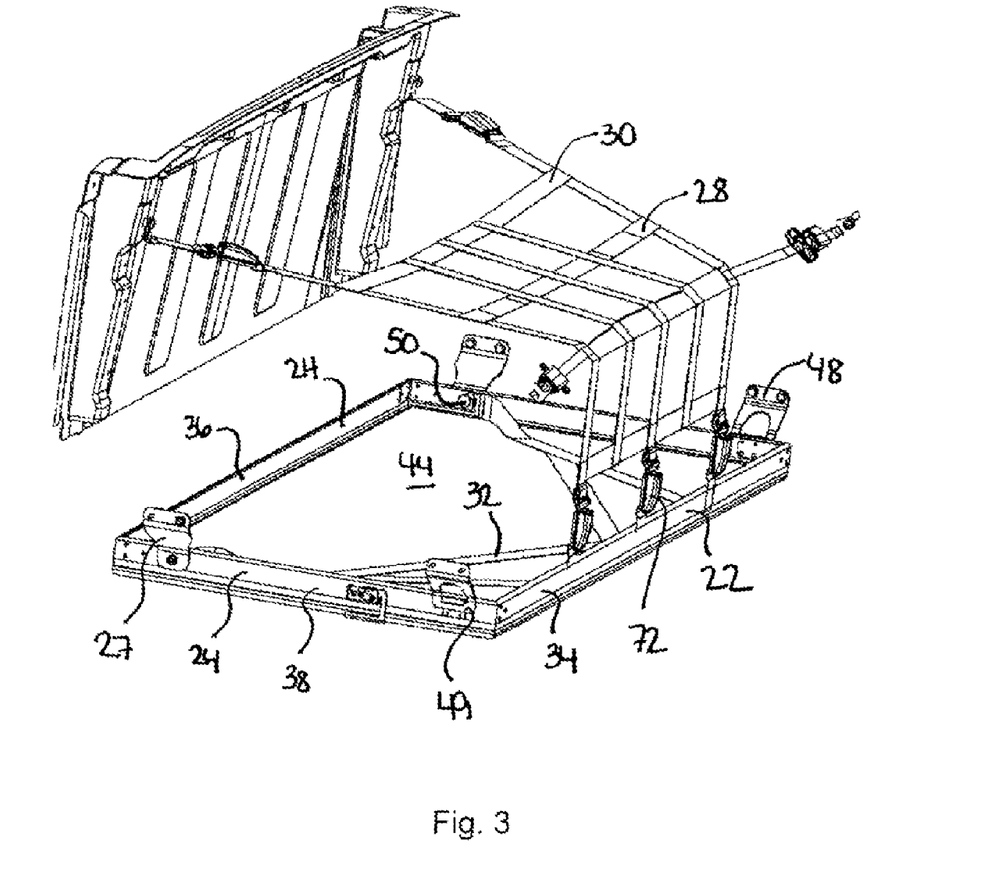
FIG. 3 is a perspective view of a fold down bed with a safety restraint system of the invention.

FIG. 3 shows the fold down bed 22 in the open position. The fold down bed has a bed frame 24 pivotally connected to a pivot bracket 26. To protect the occupant of the fold down bed 22 during travel, the fold down bed 22 has a restraint system 28 coupled to the bed frame 24. The restraint system 28 has releasably engaging upper and lower restraint devices 30, 32. The restraint system 28 can also couple to a bed frame of the bunk assembly 20 (not shown).

The fold down bed 22 has a bed frame 24 with a front slat 34, a back slat 36, and opposite side slats 38 between the front and back slats 34, 36. Each slat can have a lip 40. Each side slat 38 has a pivot hole 42 located at one end near the back slat 36 when assembled. A bushing 90 can be located within the pivot hole 42 of the side slat 38.

A mattress support 44, such as a deck, attaches to the bottom of the bed frame 24. A mattress 46 fits within the bed frame 24 and on top of the mattress support 44.

When folded down, the fold down bed 22 is supported with front brackets 48 and rear pivot brackets 26 attached to the side cab walls. Front brackets 48 connect to the side cab walls 16, 17 and engage stops located on the outer face of the side slats 38 near the front slat 34.

Figure 6:
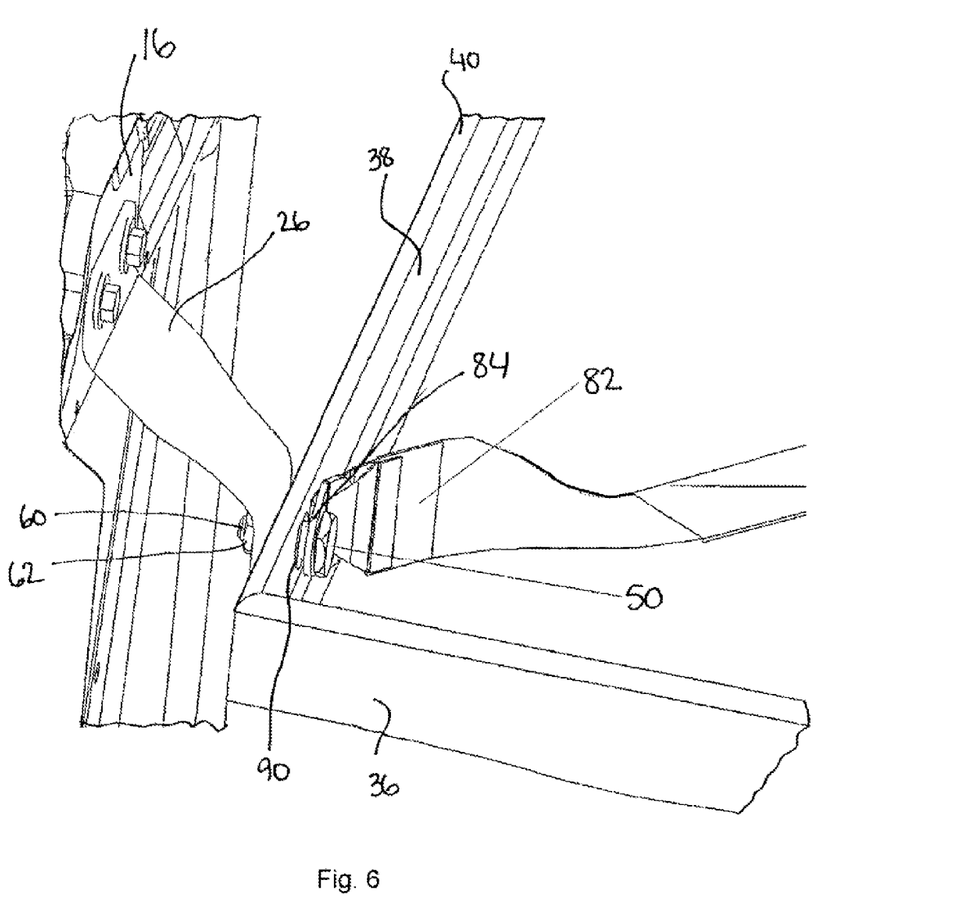
FIG. 6 is partial top perspective view of a pivot joint with the bed pivotally connected to the cab of the invention.
Figure 7:
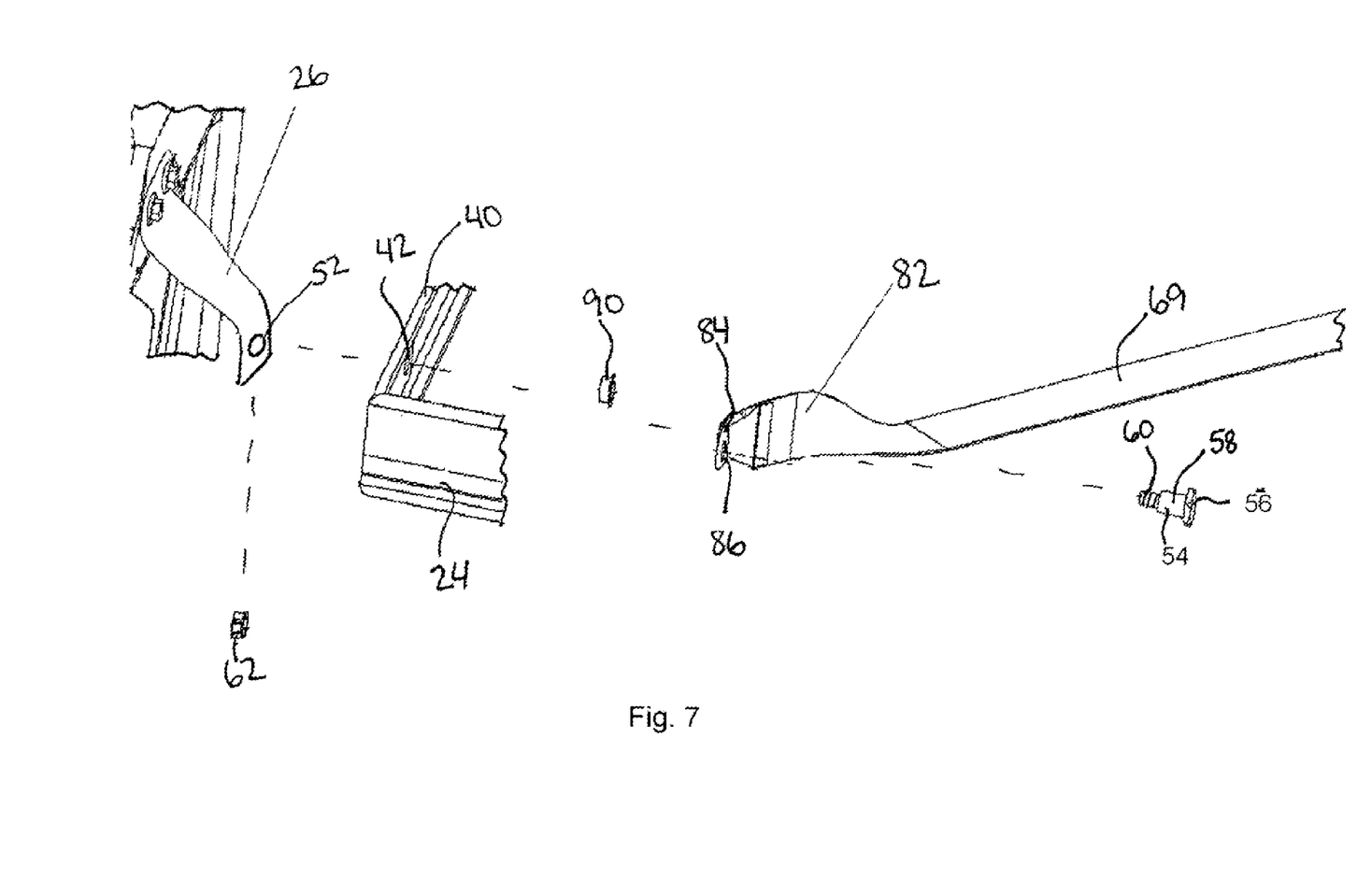
FIG. 7 is a partial exploded view of the pivot joint of the invention.

Pivot brackets 26, 27 fasten to the side cab walls 16, 17 near the back cab wall 14. The pivot brackets 26, 27 pivotally connect to the side slats 38 of the bed frame 24 near the back slat 36. Pivot bracket 26 can have a pivot bore 52 located at the bottom of the pivot bracket 26. The pivot bracket 26 is preferably S-shaped.

Pivot bolts 50 pivotally connect the side slats 38 of the bed frame 24 and the pivot brackets 26. A pivot bolt 50 inserts through the pivot bore 52 of one of the pivot brackets 26 and the pivot hole 42 or a bushing 90 located within the pivot hole 42 of the side slats 38. The pivot bolt 50 is preferably a shoulder bolt 54 with a flat head 56, a smooth shoulder 58 and a threaded shank 60. When assembled, a nut 62 threads onto the shank 60 to lock the pivot bolt 50 to the pivot bracket 26.

Figure 4:
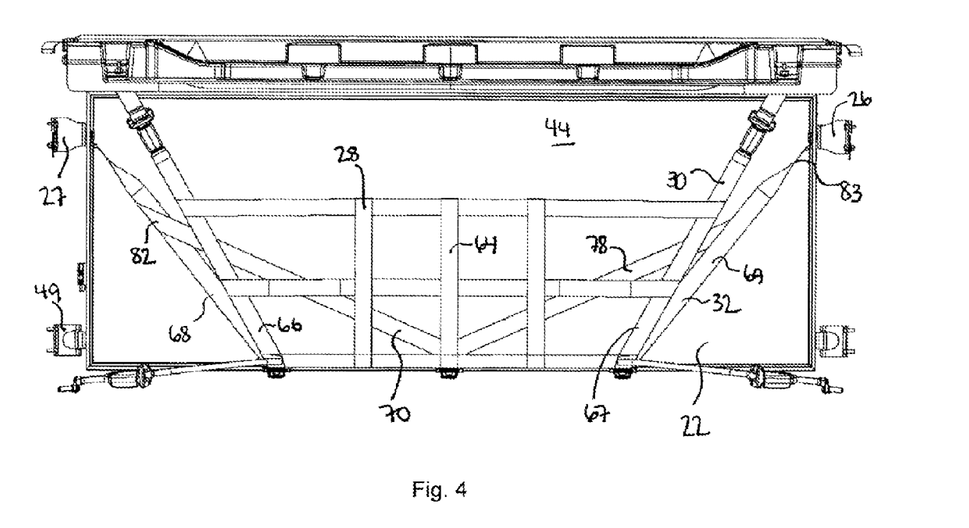
FIG. 4 is a top plan view of a fold down bed with a safety restraint system of the invention.
Figure 5:
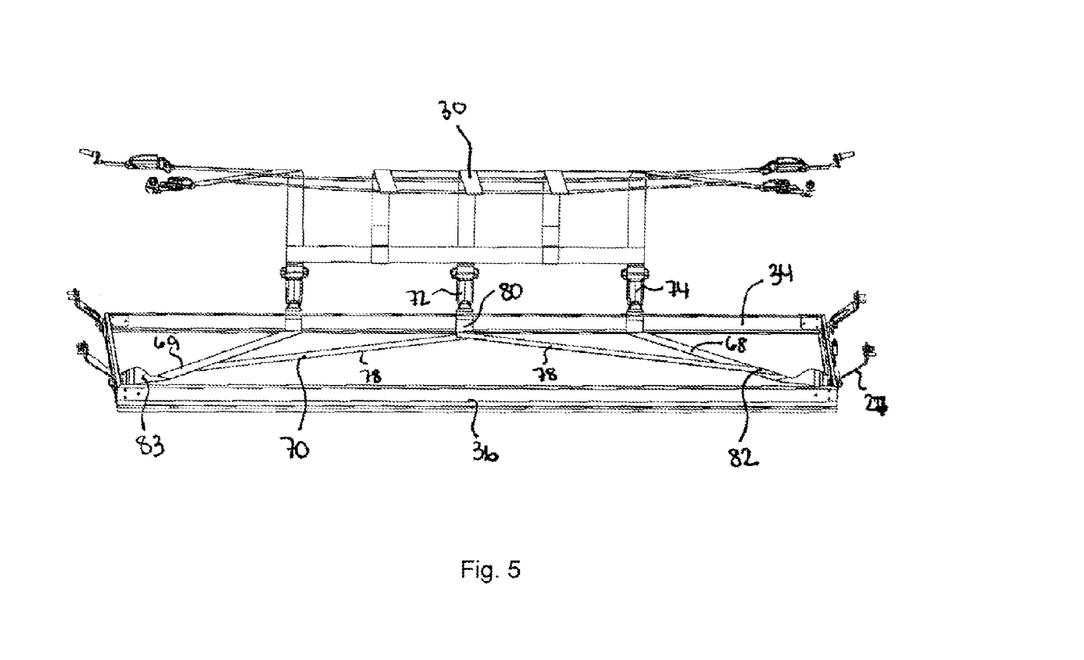
FIG. 5 is a rear view of a fold down bed with a safety restraint system of the invention.

The restraint system 28 engages the bed frame 24 at the side slats 38 with the pivot bolts 50. The restraint system 28 has a lower restraint device 32 located between the mattress support 44 and the mattress 46 of the fold down bed during use. The lower restraint device 32 matingly engages the pivot bolts 50 at the pivot brackets 26. When in use, the lower restraint device 32 releasably engages an upper restraint device 30 with a mating device 71, such as a buckle 72. The lower restraint device 32 can have lower lateral straps 68, 69 engaging upper lateral straps 66, 67 of the upper restraint device 30 and a lower central strap 70 engaging an upper central strap 64. Each end of the lower straps has part of the mating device 71, such as a female receiver 74 at the end of the lower straps 68, 69, 70.

The lower central strap 70 can be Y-shaped with two branches 78 fastened together or to a stem 80 at or near the front of the bed. The distal ends 82 of the lower central strap 70 can fasten to the lateral lower straps 68, 69, preferably distal to the buckles 72. The distal ends 83 of the lateral straps 68, 69 can have a plate 84 with an aperture 86 for receiving the pivot bolt 50. The distal ends 83 of the lateral straps 68, 69 can twist or rotate to allow the plate 84 to parallel the side slat 38 before matingly engaging the pivot bolt 50.

Figure 8:
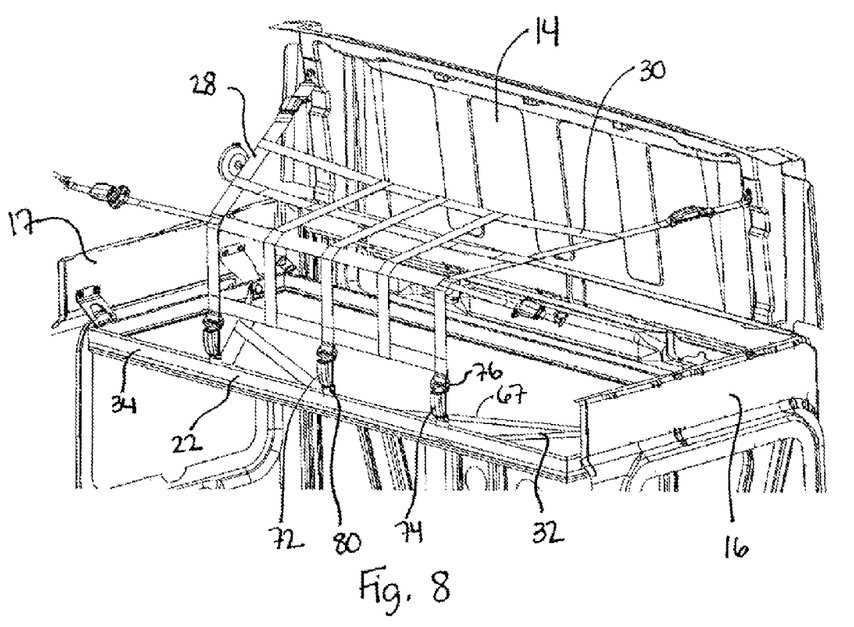
FIG. 8 is a partial side perspective view of a fold down bed and restraint system of the invention installed in a cab.

The upper restraint device 30 releasably engages the lower restraint device 32, preferably with the buckle 72. The upper restraint device 30 can have a tongue 76 that inserts within a female receiver 74 of the lower restraint device 32. The upper restraint device 30 includes a net 88 that releasably fastens to the back cab wall 14 and side cab walls 16, 17 and can include tensioners.

The restraint system for a bed of the invention has a number of advantages. The restraint system redistributes the load from the front slat of the frame to the pivot bolt and pivot bracket. The pivot bolt transfers the load to the pivot bracket which is connected to the cab wall. The much larger cab wall receives the load and is better able to disperse the force. Because the load is better distributed, there is less of a chance of distorting the bed frame during use. The restraint system also is economical, requiring fewer straps or braces to prevent distortion.

While the invention is shown in only one of its forms, it is not thus limited but is susceptible to various changes and modifications without departing from the spirit and scope of the invention.

What is claimed is:

1. A fold down bed for a motor vehicle, comprising:
   a bed frame having a front slat, a back slat, and opposite side slats between the front and back slats;
   a pivot hole in each side slat;
   pivot brackets having a pivot bore and pivotally connecting to the side slats near the back slat with a pivot bolt inserting through the pivot hole of one of the side slats and the pivot bore of one of the pivot brackets;
   a lower restraint device having an aperture matingly engaging the pivot bolt; and
   wherein the lower restraint device further comprises lower lateral straps, and a lower central strap engaging the lower lateral straps.

2. A fold down bed for a motor vehicle of claim 1, wherein the lower central strap further comprises:
   two branches; and
   a stem.

3. A fold down bed for a motor vehicle of claim 2, wherein each branch of the lower central strap fastens to one of the lateral lower straps.

4. A bed for a motor vehicle, comprising:
   a bed frame having a front slat, a back slat, and opposite side slats between the front and back slats;
   a pivot hole in each side slat;
   pivot brackets;
   a pivot bore in each pivot bracket;
   a pivot bolt inserting through the pivot hole of one of the side slats and the pivot bore of one of the pivot brackets; and
   a lower restraint device having an aperture in the lower restraint device matingly engaging the pivot bolt, the lower restraint device further comprising lower lateral straps, and a lower central strap engaging the lower lateral straps, and wherein the lower central strap further comprises a stem, and two branches, and each branch of the lower central strap fastens to one of the lateral lower straps and;
   wherein each lower lateral strap has a distal end having a plate with the aperture.

5. A bed for a motor vehicle of claim 4, wherein the plate is parallel with the side slat.

6. A bed for a motor vehicle of claim 5, further comprising:
   an upper restraint device releasably engaging the lower restraint device at the front slat of the bed.

7. A bed for a motor vehicle of claim 6, wherein the upper restraint device further comprises:
   upper lateral straps releasably engaging the lower lateral straps; and
   an upper central strap releasably engaging the lower central strap.

8. A motor vehicle, comprising:
   a cab enclosure including a back cab wall and parallel side cab walls;
   a fold down bed installed in the cab enclosure behind an operator area, the fold down bed comprising a bed frame having a front slat, a back slat, and opposite side slats between the front and back slats, a pivot hole in each side slat, and a mattress support attaching to the bed frame;
   pivot brackets connecting to the side cab walls;
   pivot bolts pivotally connecting the side slats of the bed frame and the pivot brackets; and
   a lower restraint device on the mattress support matingly engaging the pivot bolts.

9. A motor vehicle of claim 8, wherein the lower restraint device further comprises:
   lower lateral straps; and
   a lower central strap engaging the lower lateral straps.

10. A motor vehicle of claim 9, wherein the lower central strap further comprises:
    two branches; and
    a stem.

11. A motor vehicle of claim 10, wherein each branch of the lower central strap fastens to one of the lateral lower straps.

12. A motor vehicle, comprising:
    a cab enclosure including a back cab wall and parallel side cab walls;
    a bed installed in the cab enclosure behind the operator area, the bed comprising a bed frame having a front slat, a back slat, and opposite side slats between the front and back slats, a pivot hole in each side slat, and a mattress support attaching to the bed frame;

pivot brackets connecting to the side cab walls;

pivot bolts pivotally connecting the side slats of the bed frame and the pivot brackets; and a lower restraint device on the mattress support matingly engaging the pivot bolts, the lower restraint device further comprising lower lateral straps, and a lower central strap engaging the lower lateral straps, the lower central strap further comprising a stem, and two branches, each branch of the lower central strap fastens to one of the lateral lower straps; and wherein each lower lateral strap has a distal end with a plate, and an aperture.

13. A motor vehicle of claim 12, wherein the plate is parallel with the side slat.

14. A motor vehicle of claim 13, further comprising:

an upper restraint device releasably engaging the lower restraint device at the front slat of the bed.

15. A motor vehicle of claim 14, wherein the upper restraint device further comprises:

upper lateral straps releasably engaging the lower lateral straps; and an upper central strap releasably engaging the lower central strap.

\* \* \* \* \*